July 4, 1933.  G. S. KNICKERBOCKER  1,916,375
SLED WITH ENDLESS TRACK DRIVE
Filed Nov. 22, 1930   3 Sheets-Sheet 1
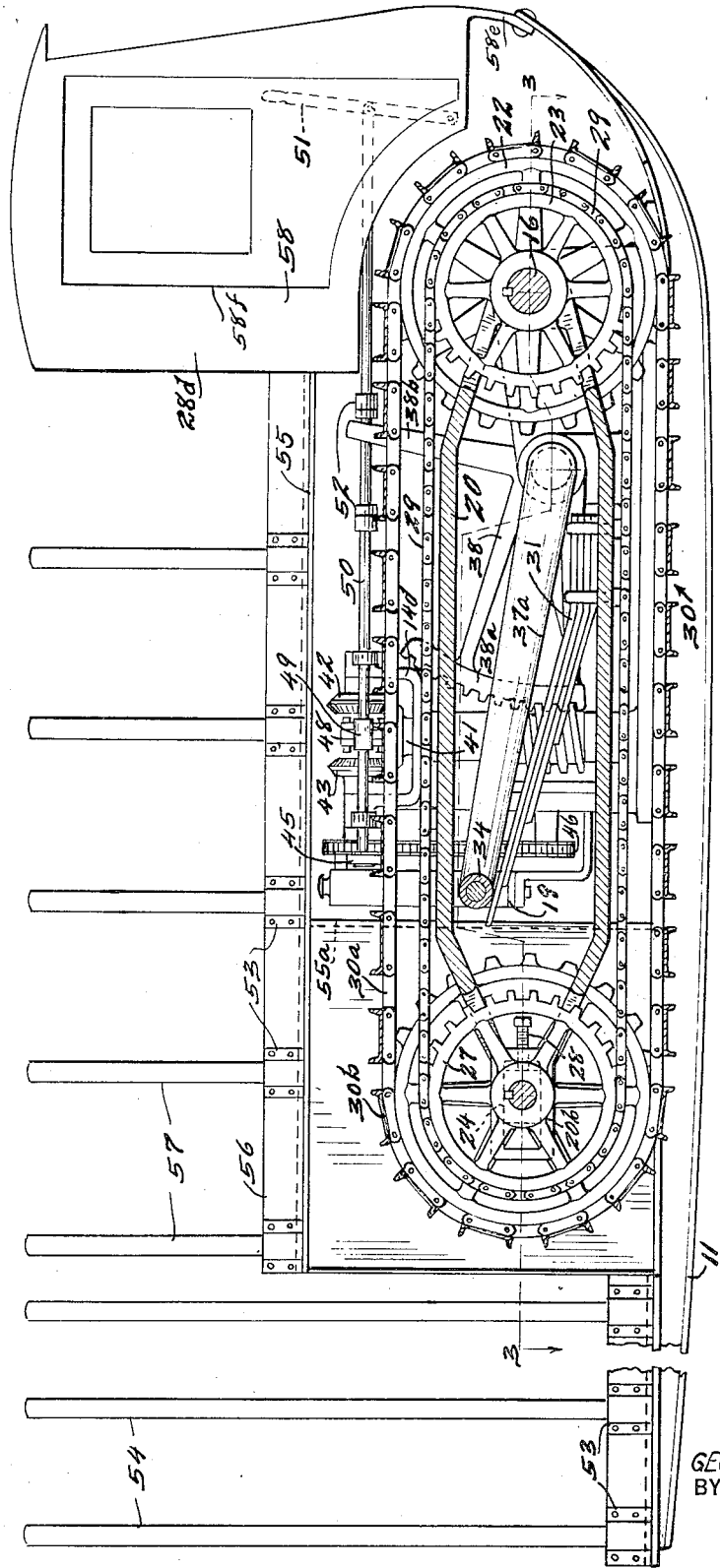
INVENTOR
GEORGE S. KNICKERBOCKER
BY
ATTORNEYS July 4, 1933.  G. S. KNICKERBOCKER  1,916,375
SLED WITH ENDLESS TRACK DRIVE
Filed Nov. 22, 1930  3 Sheets-Sheet 2
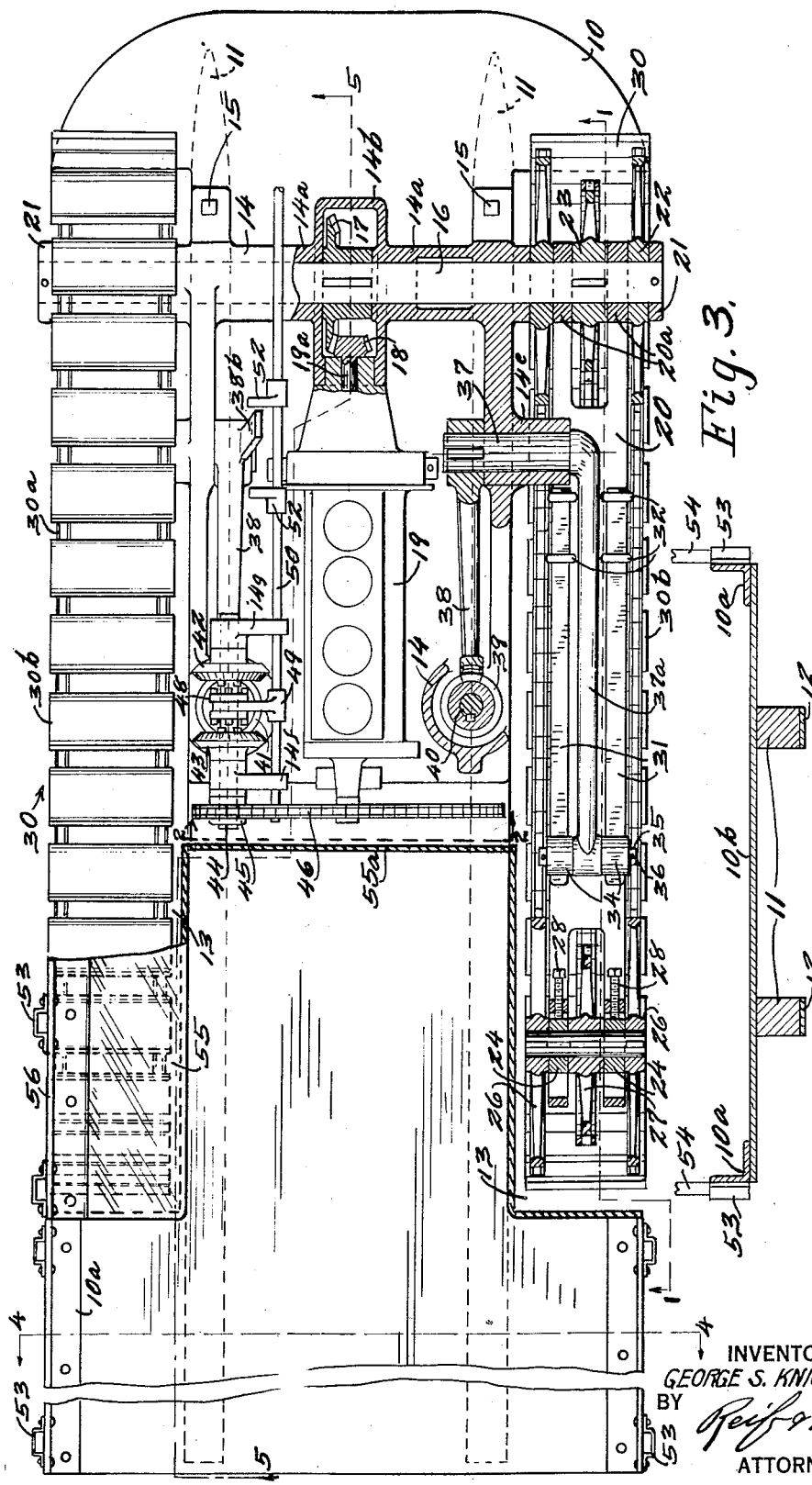
INVENTOR
GEORGE S. KNICKERBOCKER
BY
Reif & Braddock
ATTORNEYS Patented July 4, 1933

1,916,375

UNITED STATES PATENT OFFICE

GEORGE S. KNICKERBOCKER, OF MINNEAPOLIS, MINNESOTA, ASSIGNOR OF ONE-HALF TO JAMES G. BENNETT, OF MINNEAPOLIS, MINNESOTA

SLED WITH ENDLESS TRACK DRIVE

Application filed November 22, 1930. Serial No. 497,446.

This invention relates to a vehicle, and particularly to a vehicle adapted to travel over snow, ice and rough ground, as well as on ordinary roads, and comprising a frame with driving means therefor. In Canada and other places, some mines and other establishments are located a long distance from the closest railway. In such places the necessary supplies have to be transported from fifty to one hundred miles overland. In the winter season, traffic is practically impossible from the railroad to such places with ordinary vehicles. Recently, supplies have been taken to such places in the winter by airplane, but this method is rather expensive, especially for heavy materials.

It is an object of this invention, to provide a vehicle which can travel over roads and country which are covered with snow and ice, and which are practically impassable for ordinary vehicles.

It is a further object of the invention, to provide a vehicle having a frame and vertically swingable endless tracks disposed respectively at its sides, with means for forcing said tracks downwardly against the supporting surface to secure increased traction. While said vehicle may have various kinds of frames, in the embodiment of the invention illustrated a sled frame is shown.

It is another object of the invention to provide a vehicle comprising a frame, an endless track at each side of said frame disposed between the ends thereof, said tracks being vertically and independently swingable about a horizontal axis adjacent their forward ends, and means for independently swinging said tracks downwardly to depress the same against the supporting surface to secure additional traction.

It is still another object of the invention to provide a vehicle comprising a sled frame, an endless track at each side of said frame, said tracks being swingable about an axis adjacent their forward ends and comprising front and rear sprockets, means on said sled frame for driving said rear sprockets to operate said tracks, and separate means for depressing said tracks respectively to secure additional traction.

It is still a further object of the invention to provide a vehicle comprising a frame adapted to carry the load, an endless track at each side of said frame normally having its lower run substantially horizontal or parallel to the supporting surface, means on said frame for driving said tracks, and power operated means for swinging said tracks downwardly against the supporting surface to secure increased traction and for raising said tracks.

It is also an object of the invention to provide a vehicle such as set forth in the preceding paragraphs, means for swinging said tracks referred to downwardly, comprising a resilient element whereby a yielding force is applied to said tracks to move the same downwardly.

It is more specifically an object of the invention to provide a vehicle comprising a frame adapted to carry the load, a bearing on said frame, a shaft journaled in said bearing and extending transversely of said frame, a track frame journaled on said shaft at each side of said frame, front track sprockets journaled on said shaft, chain sprockets secured to said shaft, shafts journaled in the rear of said track frames respectively, track sprockets secured to said last mentioned shafts, chain sprockets secured respectively to said last mentioned shafts, chains running over said last mentioned and first mentioned chain sprockets, and endless tracks running over said track sprockets.

These and other objects and advantages of the invention will be fully set forth in the following description made in connection with the accompanying drawings, in which like reference characters refer to similar parts throughout the several views, and in which:—

Fig. 1 is a vertical section taken substantially on line 1—1 of Fig. 3;

Fig. 2 is a view in elevation as indicated by line 2—2 of Fig. 3;

Fig. 3 is a plan view of the vehicle, some parts being broken away and others shown in horizontal section;

Fig. 4 is a view partly in top plan and partly in vertical section, taken on line 4—4 of Fig. 3.

Figure 5:
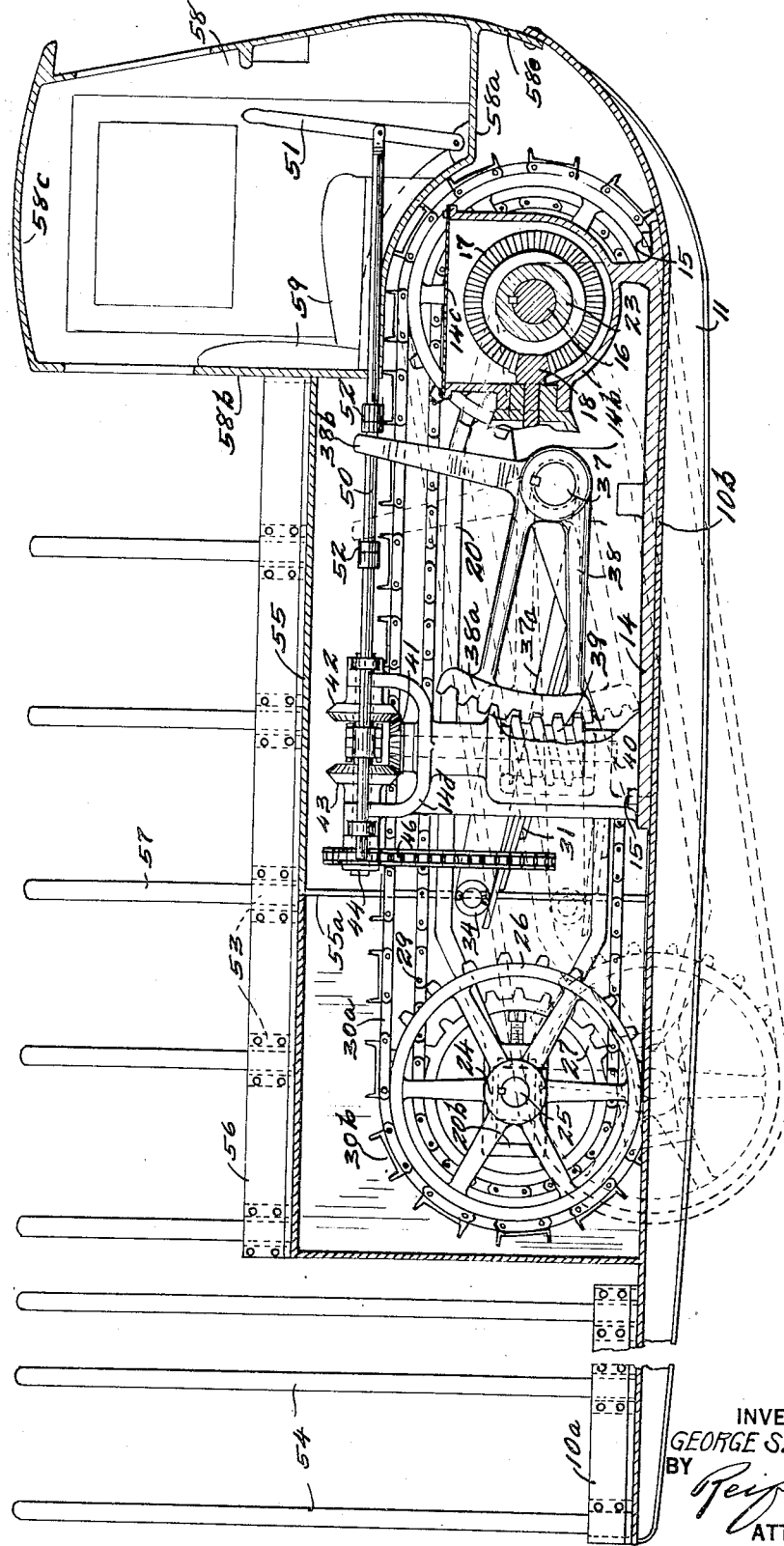
Fig. 5 is a vertical section taken on line 5—5 of Fig. 3.

Referring to the drawings, a vehicle is shown comprising a frame 10 having longitudinally extending members 10a at each side thereof, and while these members may be of any suitable or desirable construction, in the embodiment of the invention illustrated they are shown as angle bars. A plate 10b extends between members 10a, being shown as disposed beneath the horizontal flanges thereof and which is secured to members 10a. Plate 10b can be made of metal or, if desired, the same can be fabricated of boards or lumber. A pair of runners 11 are disposed beneath plate 10b, each spaced from the transverse center thereof, and said runners are shown as having metal plates 12 secured to their bottom sides. Plate 10b and runners 11 are curved upwardly at their forward ends as shown in Figs. 1 and 5, and said runners are shown as tapering toward their front and rear ends. The members 10a and plate 10b are cut away at their side portions, and intermediate their ends, forming open spaces 13 at each side of said frame. A bearing frame 14 is secured to plate 10b adjacent the forward end of the latter, and which is shown as secured by the bolts 15. Member 14 has bearings 14a at its forward end some distance above plate 10d, in which is journaled the shaft 16. Member 14 has a gear housing 14b formed thereon between bearings 14a and shaft 16 has secured thereto a beveled gear 17 disposed in housing 14b. A beveled pinion 18 meshes with gear 17 and is secured to the transmission shaft 19a of a motor 19 carried on frame 10 and illustrated as of the internal combustion type. Housing 14a is shown as having its rear end fitting over a cylindrical projection on the front of the casing of motor 19, the rear end of the housing thus being closed by said casing. Gears 17 and 18 are thus disposed in housing 14b and said housing has a cover plate 14c secured to its top as shown in Fig. 5. Shaft 16 has journaled adjacent each end thereof a track frame 20. Each track frame 20 has spaced bearings 20a at its forward end, through which shaft 16 passes. Collars 21 are pinned to the outer ends of shaft 16 and front track sprockets 22 are disposed between the outer sides of bearings 20a and collars 21 and also between the inner side of the inner bearing 20a and the ends of bearings 14a. Sprockets 22 are journaled on shaft 16 and there are thus two front track sprockets for each track frame 20. A chain sprocket 23 is secured adjacent each end of shaft 16 between the bearings 20a, said chain sprockets as well as gear 17 being shown as secured by keys. Track frames 20 have guideways 20b at their rear ends, of rectangular form, in which are slidable bearing blocks 24 in which are journaled shafts 25. Track sprockets 26 are secured at each end of the shafts 25 by any suitable means such as the keys shown, and a chain sprocket 27 is secured to shaft 25 as by the key shown, the same being disposed between bearing blocks 24. Bearing blocks 24 are engaged at their front sides by the ends of headed screws 28 threaded into the front ends of guideways 20b. A chain 29 runs over chain sprocket 23 and chain sprocket 27. Endless tracks 30 run over the front track sprockets 22 and the rear track sprockets 26. These tracks comprise the link chains 30a to which are secured the transverse cleats or shoes 30b. The track frames 20 have secured thereto intermediate their ends and adjacent each side thereof multiple leaf springs 31 secured by U-shaped nutted clips 32 embracing the same at their forward ends. Springs 31 extend upwardly and rearwardly and are engaged at their upper rear ends by rollers 34 journaled on a shaft 35 and held thereon by cotter pins 36 extending through said shaft. Shaft 35 passes through the apertured end of the lever arm 37a of a lever 37 disposed between rollers 35, which lever arm extends longitudinally of the frame 20 between springs 31 and has a portion extending at right angles thereto journaled in a bearing 14e of member 14. Lever 37 has secured thereto at the inner side of bearing 14e, an arm 38 shown as keyed to said lever, which arm 38 extends rearwardly and has a toothed segment 38a at its rear end constructed and arranged to mesh with a worm gear 39. Members 38 have upwardly extending arms 38b thereon for a purpose to be later described. Worm gear 39 is secured to a shaft 40 journaled in vertical bearings formed at the rear of member 14, said shaft having secured to its upper end a beveled gear 41. Beveled gear 41 meshes with the oppositely disposed beveled gears 42 and 43, these gears being journaled on a shaft 44 journaled in the arms of the yoke bearing 14d extending upwardly from the vertical bearing in which shaft 40 is journaled. The opposite gears 42 and 43 abut the inner sides of the bearings of the yoke 14d. A sprocket 45 is secured to shaft 44 at the outer side of one of the bearings of yoke 14d and a chain 46 runs over this sprocket and the corresponding sprocket at the other side of the machine and over a sprocket 47 secured to one end of the crank shaft 19a of the motor 19. It will be understood that there are springs 31 on each track frame 20 and the parts 33 to 45 are duplicated at each side of the machine, as clearly shown in Fig. 3. The ends of gears 42 and 43 facing each other are formed as half-clutches, with spaced teeth thereon and a clutch member 48 is slidable on shaft 44 and splined thereto. Clutch member 48 is adapted to engage with either gear 42 or 43 and also to be disposed in neutral position therebetween. Clutch 48 is engaged by a clutch fork or shifting member 49 having a hub secured to a rod 50 slidable in apertured arms 14f and 14g projecting respectively from the arms of yoke 14d. The rods 50 extend forwardly and are secured to operating levers 51 disposed in convenient position for manipulation by the driver or operator of the vehicle. The rods 50 each have secured thereto stop arms 52 arranged in spaced and oppositely disposed relation, and the arms 38b of members 38 are disposed between these members 52 and adapted alternately to engage the same.

The angles 10a of frame 10 have apertured and flanged brackets 53 secured thereto, shown as having rectangular openings therein adapted to receive the stakes 54 extending vertically about plate 10b to retain the load on the vehicle. A plate 55 is provided extending horizontally over motor 19 and members 31 to 50, and said plate has secured to its sides angle members 56 similar to members 10a which also have secured thereto brackets 53 receiving shorter stakes 57. A driver's cabin 58 is provided at the front of the frame, having a floor portion 58a, the rear portion 58b and a top portion 58c as well as side portions 58d. The side portions are provided with doors 58f and the front, rear portion and doors are provided with windows or openings. A seat 59 is provided in said cabin, upon which the driver sits. Cab 58 is shown as having a downwardly extending flange 58e riveted to the upper front edge of the plate 10b. The plate 55 or upper loading deck, extends outward over the tops of the tracks 30 so that angles 56 are substantially alined longitudinally with angles 10a and a vertical plate 55a extends from plate 10b to the plate 55. The lower loading deck or plate 10b thus is at one level in the rear of the tracks 30, and between said tracks and the vertical plate 55a.

In operation the motor 19 is operated and shaft 16 is driven through the gears 17 and 18. Chain sprockets 23 are driven by shaft 16 and through chain 29 the rear chain sprockets 27 are driven. The track sprockets 26 being secured to shafts 25, as are also the sprockets 27, these track sprockets 26 are thus driven and the tracks 30a are driven by the rear track sprockets. The front track sprockets 22 are journaled on shaft 16 and are thus not driven. The tracks are thus driven from the rear and the lower run of the track which moves rearwardly is kept taut, any slack being in the top run of the tracks. As shown in Fig. 1, the lower run of the tracks is somewhat above the bottom of the runners 11. The runners, of course, will sink somewhat into the supporting surface, especially if it be soft snow. If there is not sufficient traction to propel the vehicle with the tracks in the position shown in Fig. 1, the operator will operate levers 51 to connect the gears 42 or 43, which acts to depress lever arm 37. If the vehicle is running on level ground, both levers 51 will be operated and through the shafts 40, worms 39, arms 38 and 37, the track frames 20 and the tracks 30 will be depressed by arm 37 pressing down on the springs 31. The tracks and track frames swing downwardly about the axis of shaft 16. This depression of the tracks into the supporting surface gives additional traction and this downward movement can be continued until the desired traction is obtained. Owing to the fact that the tracks are driven from the rear and travelling downward about the front of the front track sprockets, the same have a tendency to climb out of any depression. The vehicle thus has a great facility for getting out of hollows or soft places, and does not dig in and become further mired. As the tracks must be depressed against the gravity pressure of the load, the mechanism for depressing the tracks is made quite rugged and heavy, as shown by the construction of parts 39 and 38. The stop members 52 are provided to prevent an excessive downward or upward movement of the tracks. If such movement occurs, the arms 38b engage the stops 52 and move the clutches 48 to neutral position. It will be understood that the tracks and track frames are lowered through the resilient elements or springs 31 and when levers 37 move upwardly, the rollers 34 engage the top of the track frames 20, as clearly shown in Fig. 1, and the tracks are thus elevated by levers 37, rollers 34 rolling along the under side of the top of said track frame. Should the vehicle be moving along a hillside, the track 30 on the lower side of the inclination can be lowered and the body of the vehicle thus kept substantially level. The tracks 30 are also depressed when it is desired to turn the vehicle. If the track on the right hand side is depressed, and the other track somewhat elevated, the vehicle will turn to the left and vice versa. The movement of the vehicle is thus entirely controlled by the movement of the tracks and track frames.

From the above description it is seen that applicant has provided a very simple and efficient vehicle adapted to travel over rough and snow covered ground. The vehicle is designed to not only pass over roads which are snowed in, but to go across country when necessary. The endless tracks are capable of climbing over very rough ground and ground which contains more or less obstruction such as stones and stumps. The tracks can be moved downwardly and upwardly to effectively govern the vehicle at all times, and to properly steer the same.

The device will have a high degree of utility for the purpose intended.

The device can be used to coast where going downhill, and if necessary, the tracks may be used as brakes. The motor will, as usual, be provided with a transmission including the usual forward and reverse speeds. If the vehicle be stopped at night and the runners freeze to the supporting surface, the same can be loosened by starting the motor and depressing the tracks before moving forwardly. The tracks can also be moved downwardly to raise the vehicle so that it will pass over obstructions such as stumps or stones. The front end of the vehicle will be somewhat raised when the tracks are lowered, so that the vehicle will ride over the snow. The higher the speed of the vehicle, the more easily it will ride over the snow. The vehicle can also be used for travelling around lake shores, either at the edge or on the ice when the lakes are frozen in winter. It will thus be seen that the vehicle is well adapted for winter traffic over rough places.

It will, of course, be understood that various changes may be made in the form, details, arrangement and proportions of the parts, without departing from the scope of applicant's invention, which generally stated, consists in a device capable of carrying out the objects above set forth and in the parts and combinations of parts disclosed and defined in the appended claims.

What is claimed is:—

1. A vehicle having in combination, a frame adapted to carry the load, a shaft carried by said vehicle frame, a track frame at each side of said vehicle frame journaled adjacent its front end on said shaft, front and rear track sprockets in said frames, an endless track for each frame running over said track sprockets, shafts journaled in the rear end of said track frames to which said rear track sprockets are secured, means for driving said last mentioned shafts, and separate means for forcing said track frames downwardly about said first mentioned shafts to depress said tracks for securing additional traction.

2. A vehicle having in combination, a sled frame adapted to carry the load, a track frame at either side of said sled frame and swingable about a horizontal axis adjacent its forward end, an endless track carried by each of said track frames, a spring secured to each track frame, a lever at each side of said sled frame having one end engaging said spring, and means for moving said lever to depress said spring and endless track for securing additional traction, said means being adapted to maintain said tracks at various different adjustments.

3. A vehicle having in combination, a frame, a bearing thereon, a shaft journaled in said bearing, a track frame swingable on said shaft at each side of said frame, an endless track carried by each track frame, chain sprockets secured to said shaft, front track sprockets journaled on said shaft, shafts journaled in the rear portions of said track frames respectively, rear sprockets respectively secured to said last mentioned shafts, chain sprockets respectively secured to said last mentioned shafts, a chain running between said chain sprockets on said first mentioned shafts and last mentioned shafts, and means on said sled frame for driving said first mentioned shaft, whereby the rear track sprockets are driven.

4. A vehicle having in combination, a frame adapted to carry the load, a track frame at each side of said frame pivoted about a horizontal axis adjacent its front end, an endless track carried by each track frame, a motor on said frame for driving said tracks, means driven by said motor and including a clutch for forcing said tracks downwardly, and means for throwing out said clutch to stop the operation of said last mentioned means when said tracks are moved downwardly a certain distance.

5. A vehicle having in combination, a frame adapted to carry the load, a track frame at each side of said frame pivoted about a horizontal axis adjacent its front end, an endless track carried by each track frame, a motor on said frame for driving said tracks, means driven by said motor and including a clutch for moving said tracks downwardly and upwardly, and means for disconnecting said clutch to stop the operation of said last mentioned means when said tracks are moved upwardly a certain distance.

6. A vehicle having in combination, a sled frame, an endless track at each side of said frame intermediate the ends thereof, front and rear track sprockets for said tracks, said tracks being swingable vertically about the axes of said front track sprockets, a motor for driving said tracks, means for depressing and raising each of said tracks, a shaft for each track driven from said motor, and clutch means for connecting said last mentioned means to said shaft for actuating the same.

7. A vehicle having in combination, a sled frame, an endless track at each side of said frame intermediate the ends thereof, front and rear track sprockets for said tracks, said tracks being swingable vertically about the axes of said front track sprockets, a motor for driving said tracks, means for depressing and raising each of said tracks, including a beveled gear, a shaft driven by said motor, oppositely disposed beveled gears on said shaft meshing with said beveled gear, a clutch secured to said shaft engageable with either of said last mentioned beveled gears to connect the same to said shaft and raise or depress said track respectively, and means operable by the driver of said vehicle for moving said clutch.

8. A vehicle having in combination, a frame, a bearing secured to said frame adjacent its forward end, said frame having recesses at each side thereof, track frames extending longitudinally and disposed in said recesses and journaled at their forward ends on said bearing, endless tracks carried by said frames, and means secured to said frame for forcing said frames and tracks downwardly about the axis of said shaft.

9. A vehicle having in combination, a unitary frame extending substantially the length of said vehicle and adapted to carry the load, a bearing secured to said frame adjacent its forward portion, said frame having recesses at each side thereof, track frames extending longitudinally and disposed in said recesses and journalled at their forward ends upon said bearing, an endless track carried by each track frame, and means secured to said frame for forcing said tracks and track frames downwardly to tilt said frame.

10. A vehicle having in combination, a sled frame, an endless track at each side of said frame intermediate the ends thereof, front and rear track sprockets for said tracks, said tracks being swingable vertically about the axes of said front track sprockets, a motor for driving said tracks, and means including a worm-gear connection for depressing and raising each of said tracks, said means being driven by said motor.

11. A vehicle having in combination, a frame including slidable runners adapted to carry the load, an endless track at the outer side of each runner and vertically swingable about a horizontal axis and relatively to said runners, a motor on said frame for driving said tracks, means driven by said motor for independently pushing said tracks downwardly about said axes to depress the tracks to secure additional traction, and means for maintaining said tracks at any one of a plurality of positions to which the tracks are vertically adjustable.

GEORGE S. KNICKERBOCKER.